United States Patent
Hanashima et al.

(10) Patent No.: US 9,358,876 B2
(45) Date of Patent: Jun. 7, 2016

(54) EXHAUST SYSTEM MOUNTING STRUCTURE FOR VEHICLE

(71) Applicant: HONDA MOTOR CO., LTD., Tokyo (JP)

(72) Inventors: Shun Hanashima, Wako (JP); Tadashi Oshima, Wako (JP); Takaaki Shomura, Wako (JP); Yuji Maki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 190 days.

(21) Appl. No.: 14/160,950

(22) Filed: Jan. 22, 2014

(65) Prior Publication Data

US 2014/0202785 A1    Jul. 24, 2014

(30) Foreign Application Priority Data

Jan. 23, 2013   (JP) ................................ 2013-010447

(51) Int. Cl.
| | |
|---|---|
| *B60K 13/04* | (2006.01) |
| *F01N 13/08* | (2010.01) |
| *F01N 13/18* | (2010.01) |
| *F01N 1/00* | (2006.01) |

(52) U.S. Cl.
CPC . *B60K 13/04* (2013.01); *F01N 1/00* (2013.01); *F01N 13/08* (2013.01); *F01N 13/1822* (2013.01); *F01N 2340/04* (2013.01)

(58) Field of Classification Search
CPC .......... B60K 13/04; F01N 1/00; F01N 13/08; F01N 13/1822; F01N 2340/04
USPC .......................................................... 180/309
See application file for complete search history.

(56) References Cited

U.S. PATENT DOCUMENTS

| | | | | |
|---|---|---|---|---|
| 2,584,674 | A * | 2/1952 | Da Costa ........................ | 60/278 |
| 2,861,418 | A * | 11/1958 | Lewis ............................. | 60/313 |
| 4,408,675 | A * | 10/1983 | Keller ............................ | 180/296 |
| 4,596,304 | A * | 6/1986 | Teshima ........................ | 180/297 |
| 4,819,428 | A * | 4/1989 | Ciccarone ...................... | 60/323 |
| 5,560,651 | A * | 10/1996 | Kami et al. .................... | 280/788 |
| 5,726,398 | A * | 3/1998 | Zahn et al. .................... | 181/282 |
| 2003/0116378 | A1* | 6/2003 | Cathcart et al. ............... | 181/240 |
| 2004/0195019 | A1 | 10/2004 | Kato et al. | |
| 2005/0198947 | A1* | 9/2005 | Konstantakopoulos et al. ............................... | 60/323 |
| 2009/0094968 | A1* | 4/2009 | Ikegami et al. ................ | 60/310 |
| 2009/0102220 | A1* | 4/2009 | Oshio et al. ................... | 296/39.1 |
| 2009/0183937 | A1* | 7/2009 | Yamamura et al. .......... | 180/89.2 |

* cited by examiner

*Primary Examiner* — John Walters
*Assistant Examiner* — James Triggs
(74) *Attorney, Agent, or Firm* — Squire Patton Boggs (US) LLP

(57) ABSTRACT

An exhaust port formed on one side portion of an engine body along the vehicle width direction, the exhaust port connected to an exhaust muffler arranged in an extending manner in the vehicle width direction along a rear edge of the vehicle body frame by way of an exhaust pipe passage means that introduces an exhaust gas from the exhaust port. The exhaust pipe passage means is arranged in an extending manner in the longitudinal direction of the vehicle while having a bent portion bent toward the center in the vehicle width direction from one side of the engine body in the vehicle width direction behind the engine body, as viewed in a plan view.

12 Claims, 11 Drawing Sheets

EXHAUST SYSTEM MOUNTING STRUCTURE FOR VEHICLE

BACKGROUND

1. Field

Embodiments of the present invention relate to a vehicle where an engine body of an internal combustion engine and a transmission which is contiguously mounted on the engine body so as to constitute a power unit cooperatively with the internal combustion engine, are mounted on an intermediate portion of a vehicle body frame in the longitudinal direction of the vehicle. Embodiments of the present invention more particularly relate to the improvement of the exhaust system mounting structure.

2. Description of the Related Art

When an engine body and a transmission are arranged on an intermediate portion of a vehicle in the longitudinal direction of the vehicle, it is difficult to ensure a space for routing an exhaust pipe. In view of the above, in the technique disclosed in, for example, U.S. Laid-Open Patent Publication 2004/0195019 (Patent Literature 1), the exhaust pipe is arranged in a vertically meandering manner between the engine body and an exhaust muffler arranged behind the engine body.

SUMMARY

However, in the technique disclosed in Patent Literature 1 where the exhaust pipe vertically meanders, although a pipe length of the exhaust pipe can be ensured, the exhaust pipe becomes complicated so that the number of bending portions of a pipe passage is increased leading also to the increase of the pipe passage resistance.

The present invention has been made in view of the above-mentioned circumstances, and it is an object of the present invention to provide the exhaust system mounting structure for a vehicle where a pipe passage from an exhaust port to an exhaust muffler is arranged such that a pipe passage length can be ensured while decreasing the number of bending portions in a state where a volume of the exhaust muffler is ensured.

To achieve the above-mentioned object, according to certain embodiments, in a vehicle where an engine body of an internal combustion engine and a transmission which is contiguously mounted on the engine body so as to constitute a power unit cooperatively with the internal combustion engine are mounted on an intermediate portion of a vehicle body frame in the longitudinal direction of the vehicle, an exhaust port is formed on one side portion of the engine body in the vehicle width direction. The exhaust port is connected to an exhaust muffler arranged in an extending manner in the vehicle width direction along a rear edge of the vehicle body frame by way of an exhaust pipe passage means which introduces an exhaust gas from the exhaust port. The exhaust pipe passage means is arranged in an extending manner in the longitudinal direction of the vehicle while having a bent portion which is bent toward the center in the vehicle width direction from one side of the engine body in the vehicle width direction behind the engine body as viewed in a plan view.

In other embodiments, the exhaust pipe passage means includes a catalyst converter which extends in the longitudinal direction of the vehicle between a pair of left and right suspensions which supports a pair of left and right rear wheels on the vehicle body frame in a suspending manner.

In other embodiments, a joint that separably connects a portion of the exhaust pipe passage means on an engine body side and a portion of the exhaust pipe passage means on an exhaust muffler side to each other is interposed in the bent portion of the exhaust pipe passage means, and a fastening member of the joint is arranged in an extending manner in the vertical direction in a frontwardly and downwardly inclined manner so as to enable the manipulation of the fastening member from below the vehicle body frame.

In other embodiments, exhaust-muffler-side hooks that extend toward a front side are fixedly mounted on a plurality of dispersed portions of the exhaust muffler. A plurality of vehicle-body-frame-side hooks individually corresponding to the exhaust-muffler-side hooks are fixedly mounted on the vehicle body frame in an extending manner toward a rear side. The exhaust-muffler-side hooks and the vehicle-body-frame-side hooks corresponding to each other are connected to each other by way of elastic members enabling the hooks to be inserted into the elastic members and to engage with the elastic members.

In other embodiments, a rear floor positioned above the exhaust muffler, which is covered with a guard member from behind, is supported on a rear portion of the vehicle body frame, and a trailer hitch arranged below the exhaust muffler is fixed to a rear end of the vehicle body frame.

According to certain embodiments, the exhaust pipe passage means connecting the exhaust port of the engine body and the exhaust muffler extends in the longitudinal direction of the vehicle while having a bent portion which is bent toward the center in the vehicle width direction from one side of the engine body in the vehicle width direction behind the engine body, as viewed in a plan view. Accordingly, it is possible to ensure the engine performance by ensuring a pipe passage length from the exhaust port to the exhaust muffler while decreasing bending of the exhaust pipe passage means. Further, the exhaust muffler is arranged in an extending manner in the vehicle width direction along the rear edge of the vehicle body frame and hence, an excellent noise prevention effect can be obtained by ensuring a volume of the exhaust muffler.

According to certain embodiments, the exhaust pipe passage means includes the catalyst converter. Accordingly, compared to the structure where a catalyst is stored in the inside of the exhaust muffler, it is possible to acquire an excellent noise prevention effect by sufficiently ensuring a volume of the exhaust muffler. Further, the catalyst converter extends in the longitudinal direction of the vehicle between the pair of left and right suspensions that support the pair of left and right rear wheels on the vehicle body frame in a suspending manner and hence, a heat generating portion attributed to a catalyst can be positioned away from the outside by covering the heat generating portion with the left and right suspensions and the rear exhaust muffler.

According to certain embodiments, the joint that separably connects a portion of the exhaust pipe passage means on the engine body side and a portion of the exhaust pipe passage means on the exhaust muffler side is interposed at the bent portion of the exhaust pipe passage means, and the fastening member of the joint is arranged in an extending manner in the vertical direction while being inclined frontwardly and downwardly in a state where the fastening member can be manipulated from below the vehicle body frame. Accordingly, a pipe passage length of the exhaust pipe passage means can be ensured and, at the same time, fastening and separating operations of the joint can be performed from below the vehicle body frame thus enhancing maintainability.

According to other embodiments, a plurality of exhaust-muffler-side hooks fixedly mounted on the exhaust muffler and extend toward a front side and a plurality of vehicle-body-frame-side hooks fixedly mounted on the vehicle body frame and extend toward a rear side, are connected to each other by way of the elastic members that enable the hooks to be inserted into the elastic members and to engage with the elastic members. Accordingly, the exhaust muffler can be easily assembled to the vehicle body frame from behind the vehicle body frame and hence, assembling property can be enhanced.

According to other embodiments, the rear floor which is supported on the rear portion of the vehicle body frame is arranged above the exhaust muffler covered with the guard member from behind, and the trailer hitch fixed to the rear end of the vehicle body frame is arranged below the exhaust muffler. Accordingly, it is possible to miniaturize the guard member dedicated to covering the exhaust muffler by protecting the exhaust muffler by the rear floor and the trailer hitch from above and below.

DETAILED DESCRIPTION

Certain embodiments are explained in conjunction with attached drawings FIG. 1 to FIG. 12. In the explanation made hereinafter, the directions "front", "rear" "left", "right", "up" and "down" are determined in accordance with the directions as viewed from an occupant who rides on an off-road traveling four-wheeled vehicle.

Figure 1:
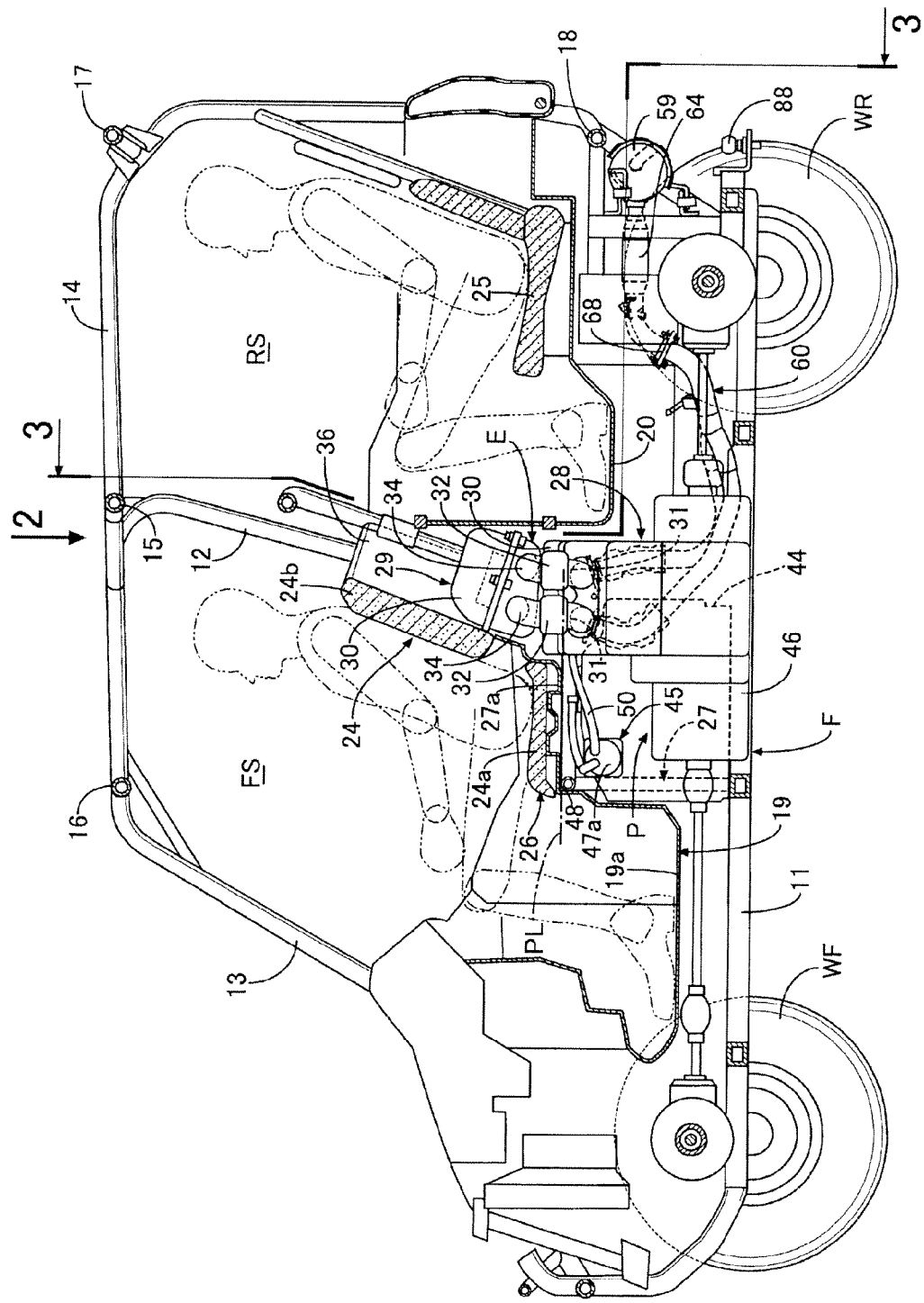
FIG. 1 is a longitudinal cross-sectional side view of an off-road traveling four-wheeled vehicle, and a cross-sectional view taken along a line 1-1 in FIG. 2.
Figure 2:
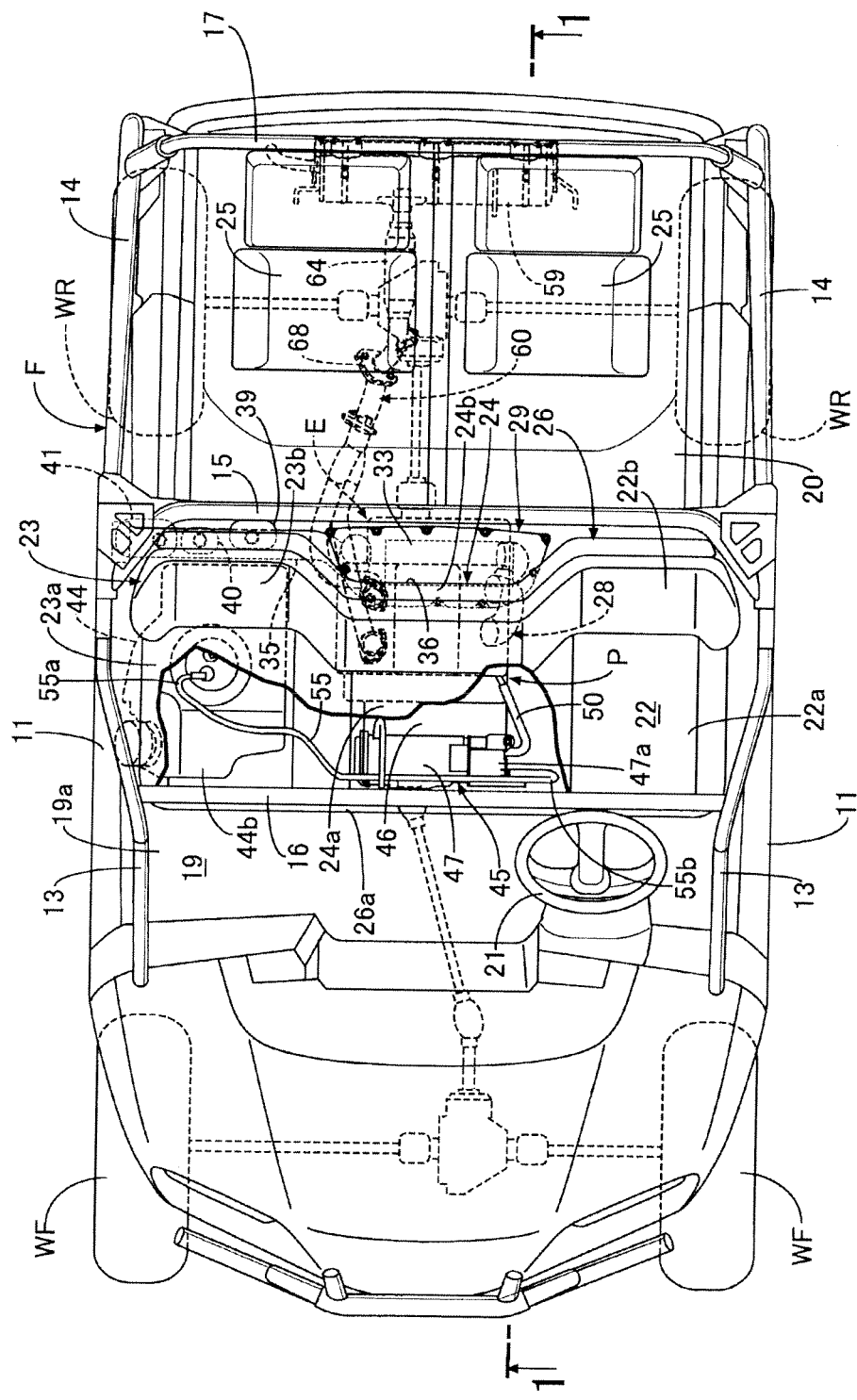
FIG. 2 is a view as viewed in the direction indicated by an arrow 2 in FIG. 1.
Figure 3:
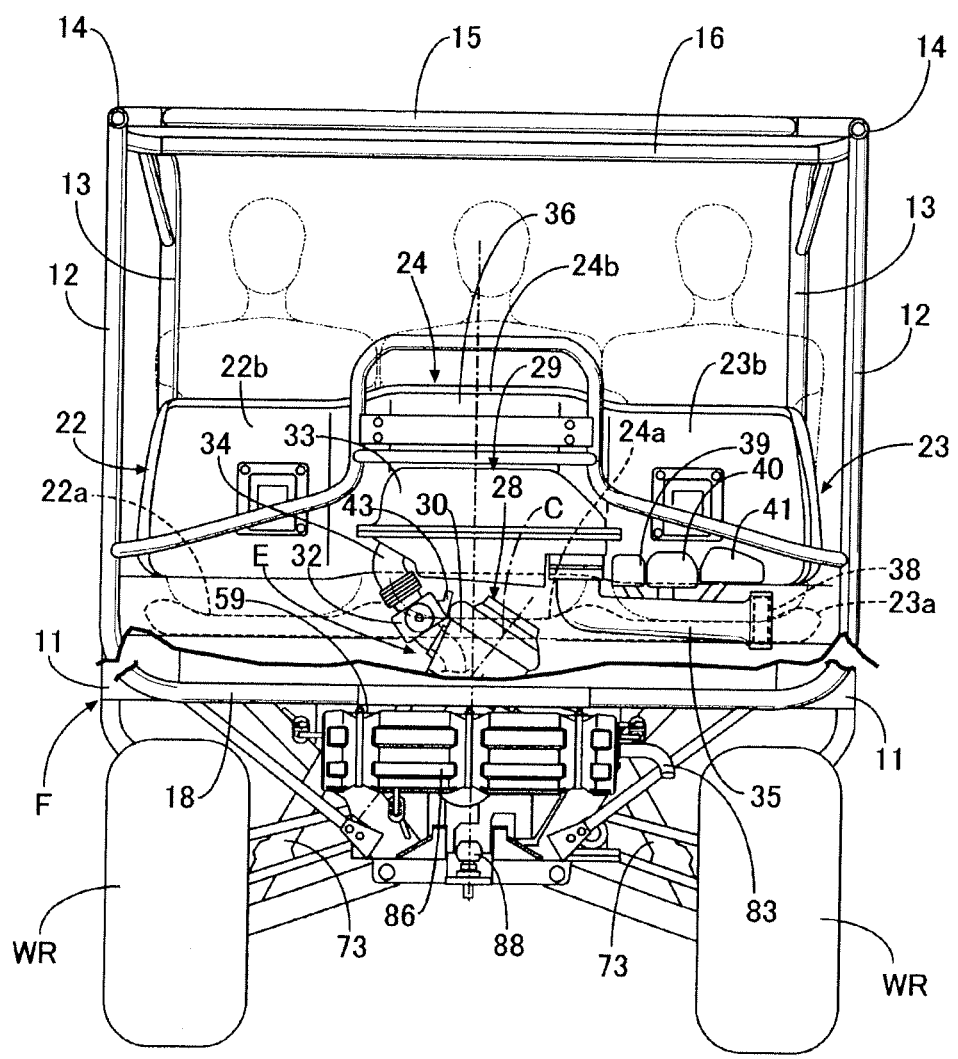
FIG. 3 is a cross-sectional view taken along a line 3-3 in FIG. 1.

As shown in FIG. 1 to FIG. 3, a pair of left and right front wheels WF is mounted in a suspended manner on a front portion of a vehicle body frame F of an off-road traveling four-wheeled vehicle, which is a four-wheeled vehicle, and a pair of left and right rear wheels WR is mounted in a suspended manner on a rear portion of the vehicle body frame F.

The vehicle body frame F includes: a pair of left and right lower frames 11 extending in the longitudinal direction; a pair of left and right center erected frames 12 erected upward from longitudinally intermediate portions of the lower frames 11; a pair of left and right front side frames 13 extending frontward from upper ends of the center erected frames 12, extends frontward and downward from intermediate portions thereof, and is contiguously connected to front portions of the lower frames 11; a pair of left and right rear side frames 14 extending rearward from the upper ends of the center erected frames 12, extends downward from intermediate portions thereof, and is contiguously connected to rear portions of the lower frames 11; a center cross member 15 which connects upper end portions of the pair of left and right center erected frames 12 to each other; a front cross member 16 connecting intermediate bent portions of the pair of left and right front side frames 13 to each other; an upper rear cross member 17 connecting intermediate bent portions of the pair of left and right rear side frames 14 to each other; and a lower rear cross member 18 connecting lower portions of the pair of left and right rear side frames 14 to each other.

The pair of left and right center erected frames 12 and the pair of left and right front side frames 13 are members for defining a profile of a front riding space FS for a driver and a passenger, and a front floor 19 arranged in front of the center erected frames 12 is supported on the front portion of the vehicle body frame F. The pair of left and right center erected frames 12, and the pair of left and right rear side frames 14, are members for defining a profile of a rear riding space RS for passengers, and a rear floor 20 arranged behind the center erected frames 12 is supported on the rear portion of the vehicle body frame F.

In the front riding space FS for the driver and the passenger, a driver's seat 22 arranged behind a steering handle 21 for steering the pair of left and right front wheels WF and a passenger's seat 23 arranged on either the left or the right side (such as, for example, a right side in this embodiment) of the driver's seat 22 are arranged in a spaced-apart manner in the vehicle width direction, and the driver's seat 22, and the passenger's seat 23 are connected to each other with an intermediate connecting portion 24 which functions as a second passenger's seat sandwiched therebetween.

The driver's seat 22 and the passenger's seat 23 respectively include seat portions 22a, 23a, and seat back portions 22b, 23b, which are erected upward from rear portions of the seat portions 22a, 23a. The intermediate connecting portion 24 includes a seat back portion 24b displaced frontward from the seat back portions 22b, 23b, and a seat portion 24a arranged between the seat portion 22a of the driver's seat 22 and the seat portion 23a of the passenger's seat 23. The driver's seat 22, the passenger's seat 23 and the intermediate connecting portion 24 are integrally formed as a bench seat 26 elongated in the vehicle width direction, and the seat portions 22a, 23a, 24a and the seat back portions 22b, 23b, 24b are integrally and contiguously formed. On the other hand, in the rear riding space RS for passengers, a pair of left and right passenger's seats 25 is arranged.

An upper surface of the front floor 19 constitutes a footrest surface 19a for an occupant seated on the bench seat 26. A seat support frame 27 which is formed by joining or combining a plurality of pipes and constitutes a part of the vehicle body frame F has an upper end portion 27a which is arranged along one plane PL, and is formed so as to be erected above the footrest surface 19a, and the bench seat 26 is supported on the upper end portion 27a of the seat support frame 27.

A two-cylinder internal combustion engine E which generates power for rotatably driving the pair of left and right front wheels WF, which constitute drive wheels and the pair of left and right rear wheels WR, which also constitute drive wheels, is mounted on the vehicle body frame F in a state where the internal combustion engine E is arranged on a center portion of the vehicle in the longitudinal direction. An engine body 28 of the internal combustion engine E is mounted on the vehicle body frame F in a posture where a cylinder axis C (see FIG. 3) is inclined toward a passenger's seat 23 side in the vehicle width direction, and the most portion of the engine body 28 is arranged below the intermediate portion of the bench seat 26 in the longitudinal direction, that is, below the intermediate connecting portion 24.

An intake device 29 of the internal combustion engine E includes throttle bodies 32 connected to intake ports 31 arranged on a left portion of the cylinder head 3C of the engine body 28 for respective cylinders, an air cleaner 33 arranged between the driver's seat 22 and the passenger's seat 23, as viewed in a plan view, a pair of connecting tubes 34, 34 connecting the throttle bodies 32 and the air cleaner 33 to each other, and a single intake duct 35 introducing air to the air cleaner 33.

The air cleaner 33 is formed in a laterally elongated manner in the vehicle width direction, and is arranged between the seat back portion 22b of the driver's seat 22 and the seat back portion 23b of the passenger's seat 23. The seat back portion 24b of the intermediate connecting portion 24 arranged between the driver's seat 22 and the passenger's seat 23 is integrally and contiguously formed with the seat back portion 22b of the driver's seat 22 and the seat back portion 23b of the passenger's seat 23, and is displaced frontward from the respective seat back portions 22b, 23b. Accordingly, the seat back portion 22b of the driver's seat 22, the seat back portion 23b of the passenger's seat 23, and the seat back portion 24b of the intermediate connecting portion 24 form a recessed portion 36 recessed frontward as viewed in a plan view, and the air cleaner 33 is arranged in the recessed portion 36.

A downstream end of the intake duct 35 extending to a right portion of the vehicle body along the seat back portion 23b of the passenger's seat 23 is connected to a right portion of the air cleaner 33, and a 2C pre-filter 38 made of dry urethane is detachably filled in an upstream end of the intake duct 35 so as to remove relatively large foreign substances. Resonators 39, 40, 41 are connected to plural portions of the intake duct 35.

A fuel injection valve 43 (see FIG. 3) is mounted on the throttle bodies 32 of the intake device 29. A fuel tank 44, which stores fuel to be supplied to the respective fuel injection valves 43, and a canister 45, which absorbs a fuel gas evaporated in the fuel tank 44, are supported on the vehicle body frame F The fuel tank 44 and the canister 45 are arranged below the bench seat 26, which is supported on the upper end portion 27a of the seat support frame 27 in a separated manner in the vehicle width direction.

At least a part of the engine body 28 and a transmission 46 which is contiguously mounted on the engine body 28 so as to constitute a power unit P cooperatively with the internal combustion engine E, are arranged below the intermediate portion of the vehicle in the longitudinal direction and below the bench seat 26. The fuel tank 44 is arranged on one side (right side) of the transmission 46 in the vehicle width direction, and the canister 45 is arranged above the transmission 46.

Figure 4:
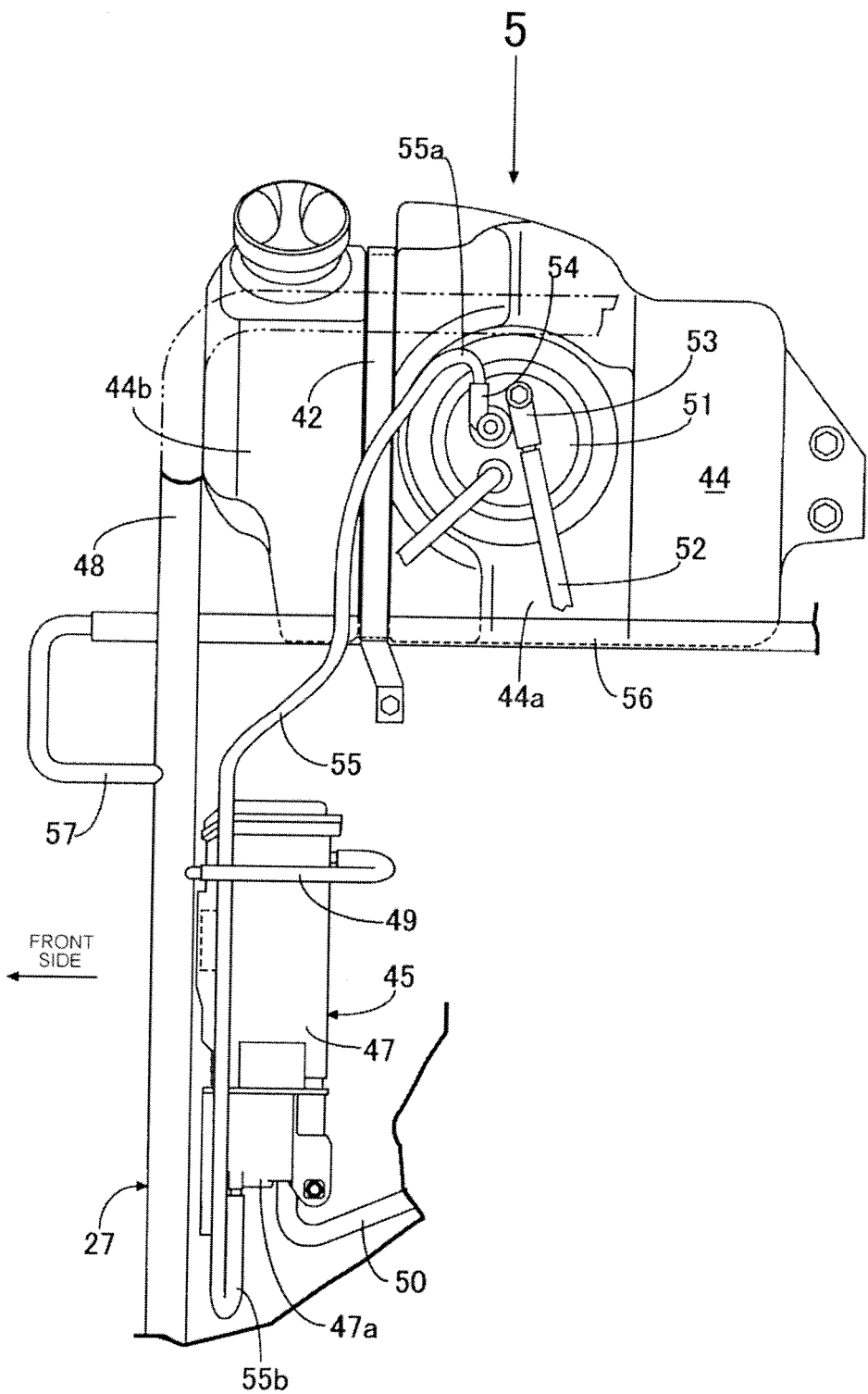
FIG. 4 is an enlarged view of an essential part of the off-road travelling four-wheeled vehicle shown in FIG. 1.

In FIG. 4, a casing 47 of the canister 45 is formed in a cylindrical shape which is elongated in the vehicle width direction, and has both ends thereof closed. The casing 47 is supported on a pipe 48 extending in the vehicle width direction so as to form a front end upper portion of the seat support frame 27.

One end portion of an atmospheric air release pipe 49 taking outside air into the canister 45 is connected to a right end portion of the casing 47 of the canister 45. The atmospheric air release pipe 49 extends frontward from the canister 45 and, then, extends rearward from the canister 45 so as to be inverted in a U shape. The other end portion of the atmospheric air release pipe 49 is connected to the inside of the pipe 48 of the seat support frame 27. The inside of the pipe 48 is connected to a front end portion of a pipe 56, which constitutes a portion of the seat support frame 27 and extends in the longitudinal direction by way of a connecting pipe 57, and a rear end portion of the pipe 56 is released to the atmosphere.

One end portion of a purging conduit pipe 50 for sucking a fuel gas from the canister 45 is connected to a left end wall 47a of the casing 47 of the canister 45, and the other end portion of the purging conduit pipe extends rearward below the bench seat 26, and is connected to the intake device 29. The intake device 29 is arranged behind the seat back portion 24b, which the intermediate connecting portion 24 of the bench seat 26 includes by way of a purging control valve not shown in the drawing.

Figure 5:
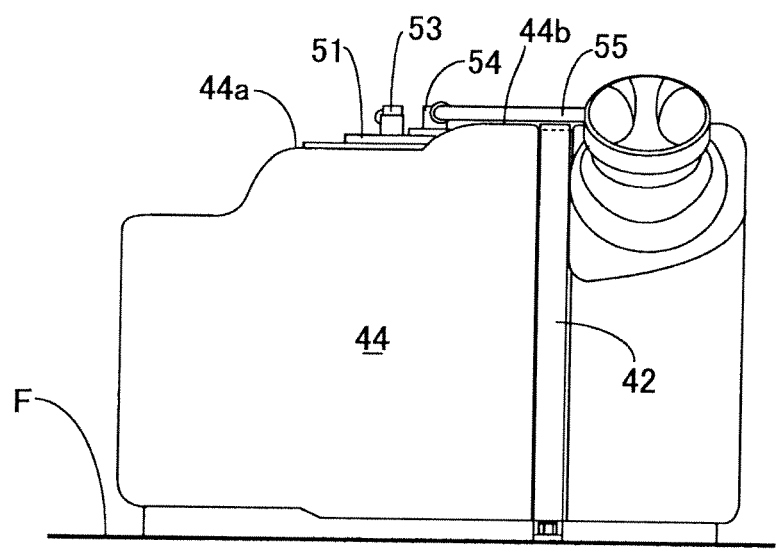
FIG. 5 is a view as viewed in the direction indicated by an arrow 5 in FIG. 4.

The fuel tank 44, as shown in FIG. 5, is fixed to a right portion of the vehicle body frame F using a band 42. A fuel pump unit 51 for discharging fuel in the fuel tank 94 toward the fuel injection valves 43 is mounted on a ceiling wall 44a of the fuel tank 44 in a state where a portion of the fuel pump unit 51 projects above the ceiling wall 44a. One end portion of a fuel conduit pipe 52 introducing fuel from the fuel pump unit 51 is connected to a fuel discharge pipe 53 mounted on an upper end of the fuel pump unit 51.

A connecting pipe 54 for connecting one end portion of a charge conduit pipe 55 introducing an evaporated fuel in the fuel tank 44 to a canister 45 side is arranged in the upper end portion of the fuel pump unit 51 such that the connecting pipe 54 projects above the ceiling wall 44a of the fuel tank 44. A bulging portion 44b bulging above a portion where the connecting pipe 59 is arranged, that is, above an upper end portion of the fuel pump unit 51 is formed on the ceiling wall 44a such that the bulging portion 44b is positioned in front of the connecting pipe 54. The bulging portion 44b and the canister 45 are arranged below the bench seat 26 such that the bulging portion 44b and the canister 45 are arranged along a front edge 26a of the bench seat 26.

The other end portion of the charging conduit pipe 55 having one end portion thereof connected to the connecting pipe 54 is connected to a left end wall 47a of the casing 47 of the canister 45. Approximately U-shaped bent portions 55a, 55b, which are bent so as to bulge outward in the vehicle width direction, are mounted on both end portions of the charging conduit pipe 55.

Figure 6:
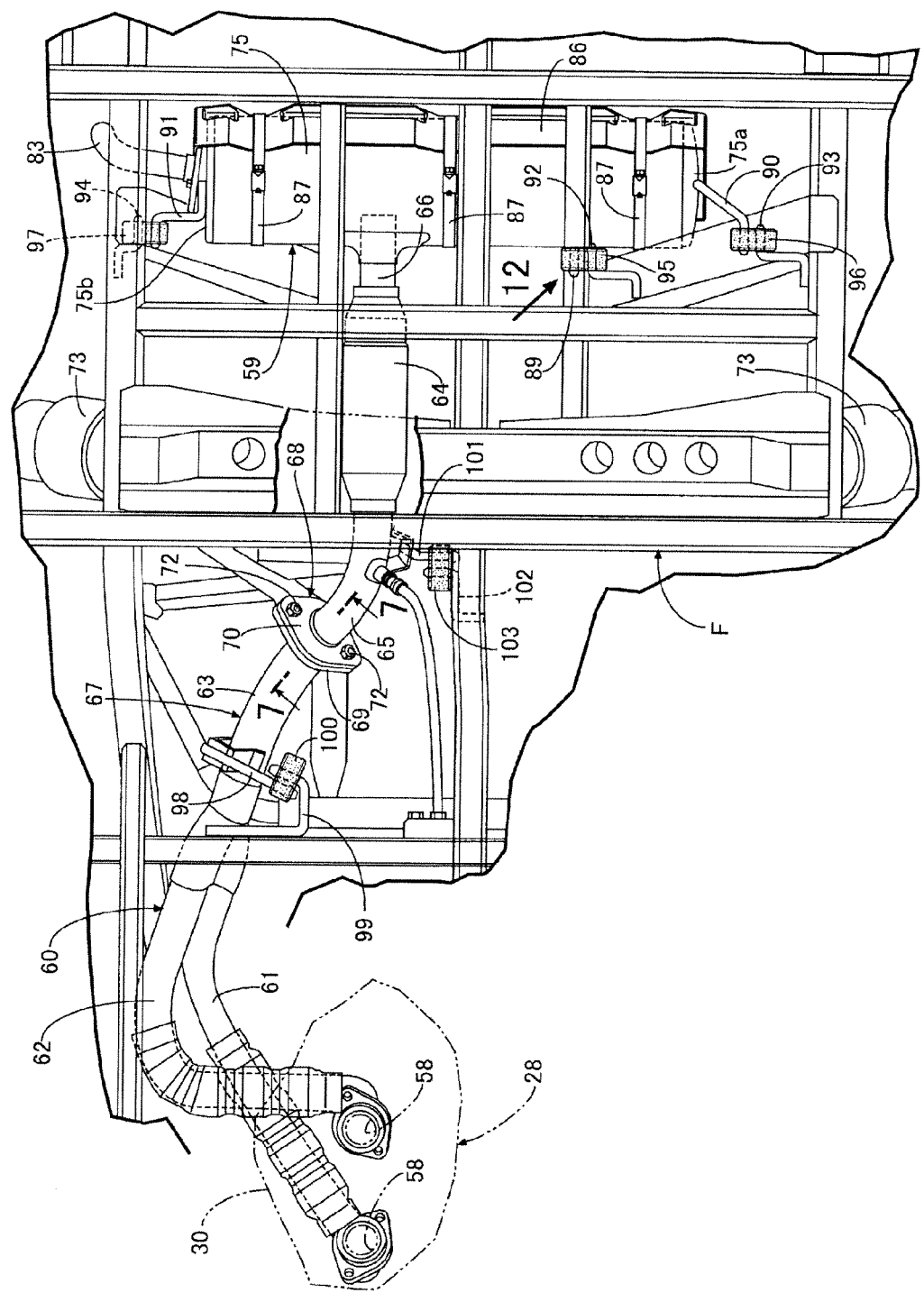
FIG. 6 is a plan view showing the arrangement of an exhaust system.

As shown in FIG. 6, a pair of exhaust ports 58 is mounted on one side portion (such as, for example, a right portion in this embodiment) of the cylinder head 30 of the engine body 28 in the vehicle width direction. The exhaust ports 58 are connected to an exhaust muffler 59 arranged in an extending manner in the vehicle width direction along a rear edge of the vehicle body frame F and is supported on the vehicle body frame F by way of the exhaust pipe passage means 60, which introduces an exhaust gas from the exhaust ports 58.

The exhaust pipe passage means 60 includes a pair of individual exhaust pipes 61, 62 with upstream end portions individually connected to the exhaust ports 58, a common exhaust pipe 63 to which the individual exhaust pipes 61, 62 are connected in common, a catalyst converter 64 extending in the longitudinal direction between a pair of left and right suspensions 73 supporting the pair of left and right rear wheels WR in a suspending manner from the vehicle body frame F, an intermediate exhaust pipe 65 connecting an upstream end of the common exhaust pipe 63 and an upstream end of the catalyst converter 64, and a final exhaust pipe 66 which connects a downstream end of the catalyst converter 64 and the exhaust muffler 59.

The pair of individual exhaust pipes 61, 62, the common exhaust pipe 63 and a part of the intermediate exhaust pipe 65 form a curved portion 67 curved toward the center in the vehicle width direction from one side (right side) of the engine body 28 in the vehicle width direction behind the engine body 28, as viewed in a plan view, and the exhaust pipe passage means 60 is arranged in an extending manner in the longitudinal direction while having the bent portion 67.

Further, in the bent portion 67, a joint 68, which separably connects the common exhaust pipe 63, which constitutes a portion of the exhaust pipe passage means 60 on an engine body 28 side and a portion of the exhaust pipe passage means 60 on an exhaust muffler 59 side, is interposed.

Figure 7:
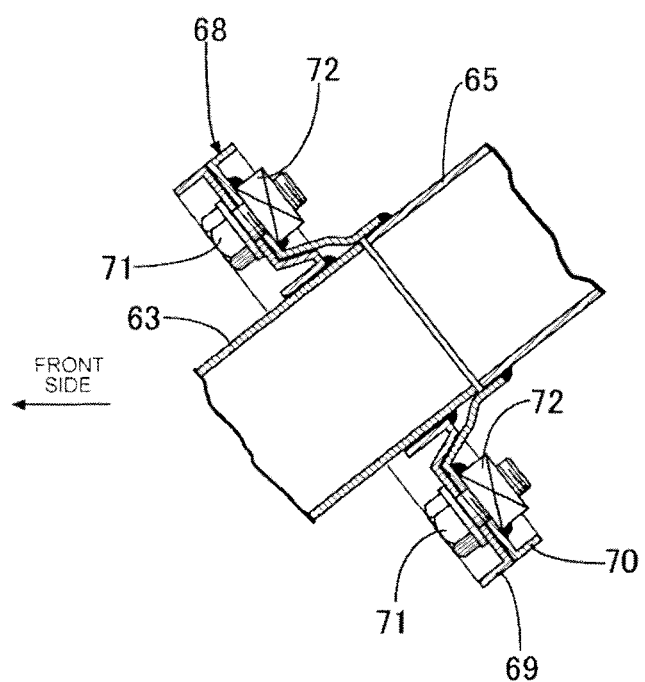
FIG. 7 is a cross-sectional view of the exhaust system taken along a line 7-7 in FIG. 6.

As shown in FIG. 7, the joint 68 is configured such that a flange 69, which is fixedly mounted on the common exhaust pipe 63, and a flange 70, which is fixedly mounted on the intermediate exhaust pipe 65, are separably fastened to each other by, for example, a pair of bolts 71 and welded nuts 72, which are fixedly mounted on the flange 70. Further, a downstream portion of the common exhaust pipe 63 and an upstream portion of the intermediate exhaust pipe 65 are formed in a frontwardly and downwardly inclined manner toward a right front side. The bolts 71 constituting fastening members of the joint 68 are arranged in an extending manner in the vertical direction while being inclined frontwardly and downwardly toward a right front side such that the bolts 71 are manipulable from below the vehicle body frame F.

Figure 8:
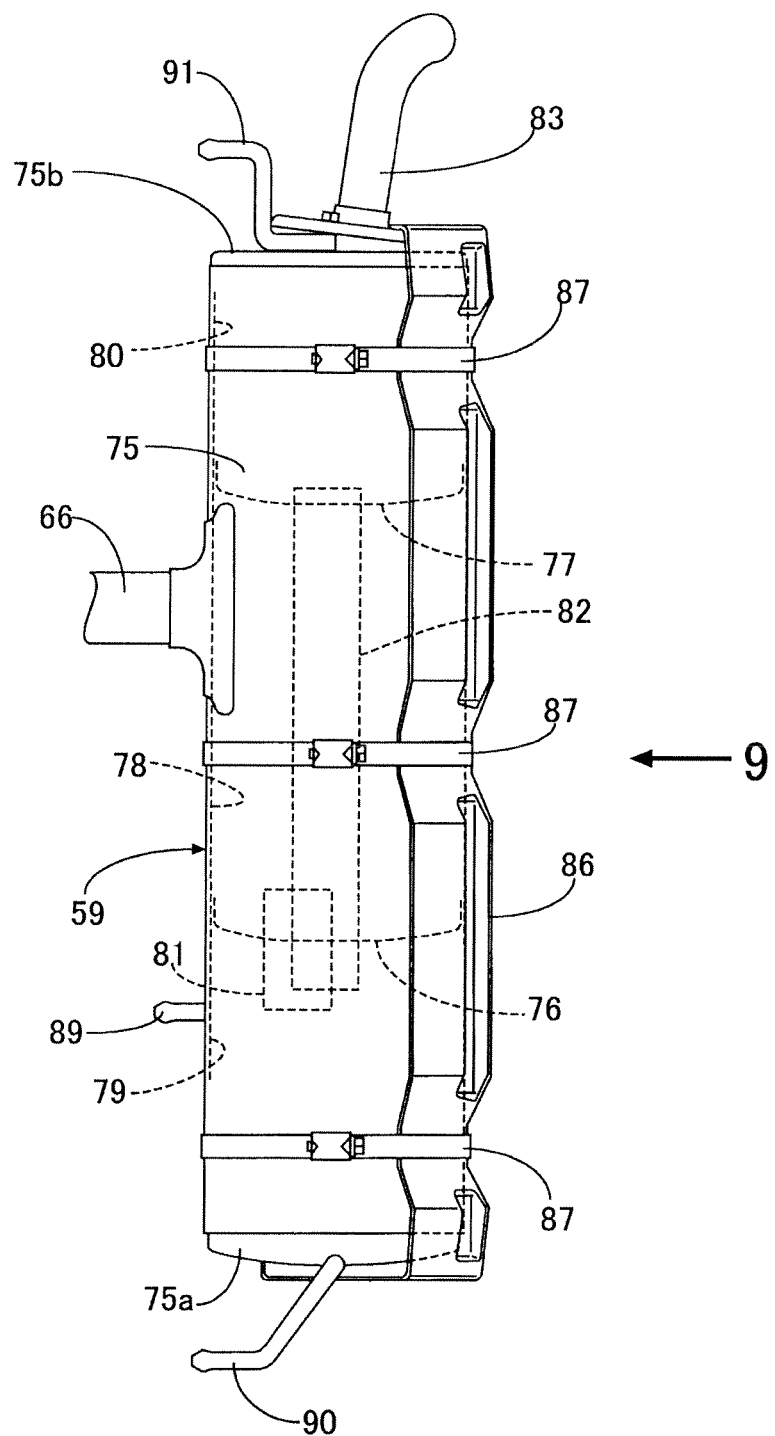
FIG. 8 is a view showing an exhaust muffler in FIG. 6 in an enlarged manner.

As shown in FIG. 8, a casing 75 of the exhaust muffler 59 is formed into an approximately cylindrical shape such that both ends of the casing 75 are closed by end walls 75a, 75b. The inside of the casing 75 is partitioned into a first chamber 78 defined at a longitudinally intermediate portion of the casing 75 by a pair of partition walls 76, 77, a second chamber 79 defined between a left end wall 75a of the casing 75 and the partition wall 76, and a third chamber 80 defined between a right end wall 75b of the casing 75 and the partition wall 77.

The final exhaust pipe 66 of the exhaust pipe passage means 60 is connected to a front side wall of the casing 75 in a communicable manner with the first chamber 78, a first communication pipe 81, which makes the first and second chambers 78, 79 communicated with each other and is fixed to the partition wall 76 in a state where the first communication pipe 81 penetrates the partition wall 76, and a second communication pipe 82, which makes the second and the third chambers 79, 80 communicated with each other is fixed to the partition walls 76, 77 in a state where the second communication pipe 82 penetrates the partition walls 76, 77. A tail pipe 83 that communicates with the third chamber 80 is mounted on the right end wall 75b of the casing 75 with a downstream-end opening portion thereof directed rearwardly and downwardly.

Figure 9:
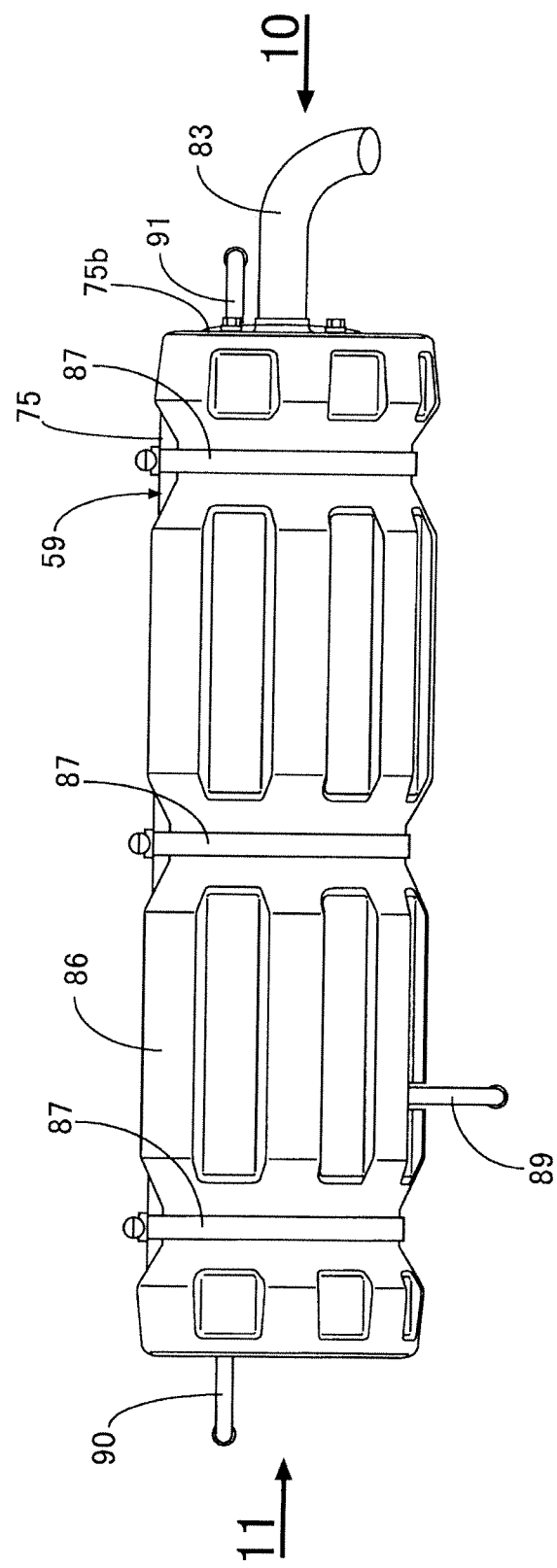
FIG. 9 is a view as viewed in the direction indicated by an arrow 9 in FIG. 8.
Figure 10:
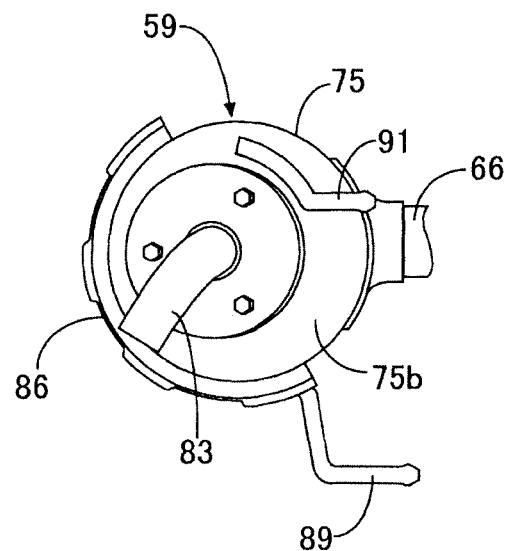
FIG. 10 is a view as viewed in the direction indicated by an arrow 10 in FIG. 9.
Figure 11:
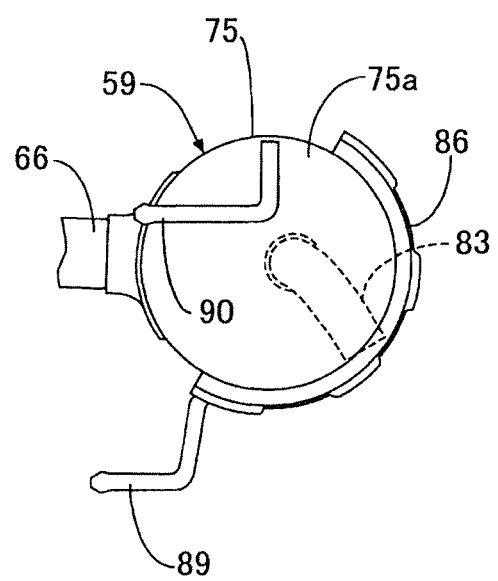
FIG. 11 is a view as viewed in the direction indicated by an arrow 11 in FIG. 9.

As shown in FIG. 9 to FIG. 11, the exhaust muffler 59 is covered with a guard member 86 from behind, and the guard member 86 is mounted on the casing 75 of the exhaust muffler 59 by, for example, three bands 87, 87, 87.

Further, the rear floor 20 supported on a rear portion of the vehicle body frame F is arranged to be positioned above the exhaust muffler 59, and a trailer hitch 88 arranged below the exhaust muffler 59 is fixed to the rear end of the vehicle body frame F.

Exhaust-muffler-side hooks 89, 90, 91 extending frontwardly are fixedly mounted on a plurality of dispersed portions, for example, three dispersed portions of the exhaust muffler 59. On the other hand, three vehicle-body-frame-side hooks 92, 93, 94, individually corresponding to the exhaust-muffler-side hooks 89, 90, 91, are fixedly mounted on the vehicle body frame F in a rearwardly extending manner as shown in FIG. 6.

Figure 12:
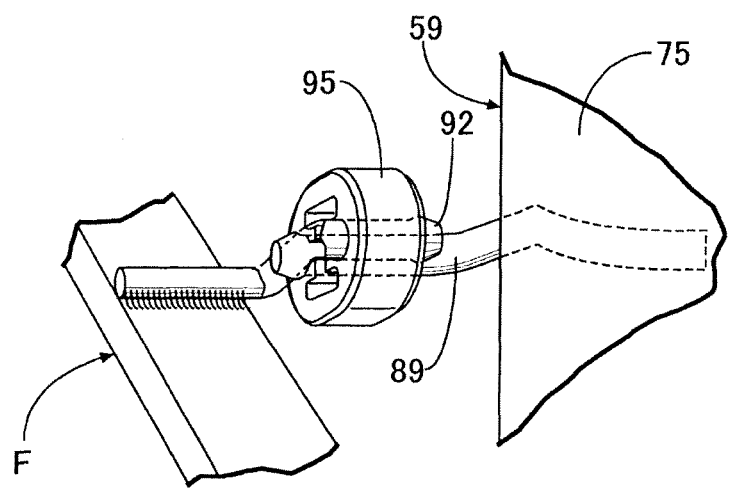
FIG. 12 is a perspective view as viewed in the direction indicated by an arrow 12 in FIG. 6.

As shown in FIG. 12, the exhaust-muffler-side hooks 89 to 91 and the vehicle-body-frame-side hooks 92 to corresponding to each other, are connected to each other by way of elastic members 95, 96, 97 enabling the hooks 89 to 91, and 92 to 94 to be inserted into the elastic members 95, 96, 97, and to engage with the elastic members 95, 96, 97.

An exhaust-pipe-side hook 98 mounted on the common exhaust pipe 63 of the exhaust pipe passage means 60, and a vehicle-body-frame-side hook 99 fixedly mounted on the vehicle body frame F, are connected to each other by way of an elastic member 100, and an exhaust-pipe-side hook 101 mounted on the intermediate exhaust pipe 64 of the exhaust pipe passage means 60, and a vehicle-body-frame-side hook 102 fixedly mounted on the vehicle body frame F are connected to each other by way of an elastic member 103.

According to certain embodiments, the driver's seat 22 and the passenger's seat 23 are integrally formed as the bench seat 26 elongated in the vehicle width direction together with the intermediate connecting portion 24 connecting the driver's seat 22 and the passenger's seat 23, the upper end portion 27a of the seat support frame 27, which is erected above the footrest surface 19a on which the occupant seated on the bench seat 26 places his feet and constitutes the part of the vehicle body frame F is formed along one plane PL, and the fuel tank 44 which stores fuel to be supplied to the internal combustion engine E and the canister 45 which absorbs a fuel gas evaporated in the fuel tank 44, are arranged in the separated manner in the vehicle width direction below the bench seat 26 supported on the upper end portion 27a of the seat support frame 27. Accordingly, a wide space can be ensured below the bench seat 26, and the fuel tank 44 and the canister 45 arranged parallel to each other in the vehicle width direction are arranged close to each other in the wide space and hence, a length of a pipe can be shortened.

At least the part of the engine body 28 of the internal combustion engine E and the transmission 46 contiguously mounted on the engine body 28 so as to constitute the power unit P cooperatively with the internal combustion engine E are arranged below the bench seat 26, the fuel tank 44 is arranged on one side (a right side in this embodiment) of the transmission 46 in the vehicle width direction, and the canister 45 is arranged above the transmission 46. Accordingly, a length of a pipe between the fuel tank 44 and the canister 45 can be shortened, and the canister 45 can be protected by the transmission 46 from below.

A radiation heat from the transmission 46 is applied to the canister 45 arranged above the transmission 46. However, the radiation heat from the transmission 46 is irradiated in a state where idling of the internal combustion engine E is sufficiently performed and hence, it is possible to exclude the influence exerted on a riding comfort by a sudden purge to the internal combustion engine E attributed to the radiation heat.

The atmospheric air release pipe 49 extending from the canister 45 so as to take in outside air into the canister 45 is connected to the inside of the pipe 48 constituting the part of the seat support frame 27. Accordingly, the seat support frame 27 can be utilized as an intake duct without increasing a length of the atmospheric air release pipe 49 and, thus, enhancing a dust intrusion prevention effect.

The cylinder head 30 constituting the part of the engine body 28 and to which the intake device 29 is connected is arranged behind the seat back portion 24b which the intermediate connecting portion 24 of the bench seat 26 has, and the purging conduit pipe 50 that introduces the fuel gas sucked from the canister 45 is connected to the intake device 29. Accordingly, the purging conduit pipe 50 can be arranged in the rearward and upward direction along a lower surface of the seat portion 24a which the intermediate connecting portion 24 has with a short pipe length and hence, the stagnation of a gas in the purging conduit pipe 50 can be prevented whereby it is possible to suppress the influence of the stagnation of a gas on the performance of the engine.

The connecting pipe 54 for connecting one end portion of the charging conduit pipe 55 which introduces the evaporated fuel in the fuel tank 44 to the canister 45 side is arranged in the fuel tank 44 such that the connecting pipe 54 projects above the ceiling wall 44a of the fuel tank 44. The bulging portion 44b bulging above the arrangement portion of the connecting pipe 54 is formed on the ceiling wall 44a such that the bulging portion 44b is positioned in front of the connecting pipe 54, and the bulging portion 44b and the canister 45 are arranged below the bench seat 26 such that the bulging portion 44b and the canister 45 are arranged along the front edge 26a of the bench seat 26. Accordingly, when a vehicle is on an ascending slope, the canister 45 is positioned above the connecting pipe 54 and hence, the intrusion of fuel to a canister 45 side can be prevented. When the vehicle is on a descending slope, fuel is stored in the bulging portion 44b and hence, the intrusion of fuel into the connecting pipe 54 side can be prevented.

The bent portions 55a, 55b having an approximately U shape bent toward the outside in the vehicle width direction, respectively, are formed on both end portions of the charging conduit pipe 55. Accordingly, when the vehicle is inclined toward a left side or a right side, the intrusion of the fuel to a canister 45 side can be prevented by these bent portions 55a, 55b and, thus, enhancing the fuel intrusion prevention performance against the inclination of the vehicle.

Exhaust ports 58 are formed on one side portion (such as, for example, right side portion in this embodiment) of the engine body 28 along the vehicle width direction, the exhaust ports 58 are connected to the exhaust muffler 59 arranged in an extending manner in the vehicle width direction along a rear edge of the vehicle body frame F by way of the exhaust pipe passage means 60 introducing an exhaust gas from the exhaust ports 58, and the exhaust pipe passage means 60 is arranged in an extending manner in the longitudinal direction while having the bent portion 67 bent toward the center in the vehicle width direction from one side (such as, for example, right side in this embodiment) of the engine body 28 in the vehicle width direction behind the engine body 28 as viewed in a plan view. Accordingly, it is possible to ensure the engine performance by ensuring a pipe passage length from the exhaust ports 58 to the exhaust muffler 59 while decreasing bending of the exhaust pipe passage means 60. Further, the exhaust muffler 59 is arranged in an extending manner in the vehicle width direction along the rear edge of the vehicle body frame F and hence, an excellent noise prevention effect can be obtained by ensuring a volume of the exhaust muffler 59.

The exhaust pipe passage means 60 includes the catalyst converter 64 extending in the longitudinal direction between the pair of left and right suspensions 73 supporting the pair of left and right rear wheels WR on the vehicle body frame F in a suspending manner. Accordingly, compared to the structure where a catalyst is stored in the inside of the exhaust muffler 59, it is possible to acquire an excellent noise prevention effect by sufficiently ensuring a volume of the exhaust muffler 59. Further, a heat generating portion attributed to a catalyst can be positioned away from the outside by covering the heat generating portion with the left and right suspensions 73 and the rear exhaust muffler 59.

At the bent portion 67 of the exhaust pipe passage means 60, the joint 68 that separably connects a portion of the exhaust pipe passage means 60 on the engine body 28 side and a portion of the exhaust pipe passage means 60 on the exhaust muffler 59 side is interposed. Bolts 71 of the joint 68 are arranged in an extending manner in the vertical direction while being inclined frontwardly and downwardly toward a right front side in a state where the bolts 71 can be manipulated from below the vehicle body frame F. Accordingly, a pipe passage length of the exhaust pipe passage means 60 can be ensured and, at the same time, fastening and separating operations of the joint 68 can be performed from below the vehicle body frame F thus enhancing maintainability.

Exhaust-muffler-side hooks 89, 90, 91 extending toward a front side are fixedly mounted on a plurality of dispersed portions of the exhaust muffler 59, and a plurality of vehicle-body-frame-side hooks 92, 93, 94 individually corresponding to the exhaust-muffler-side hooks 89, 90, 91, extend toward a rear side and are fixed to the vehicle body frame F. The exhaust-muffler-side hooks 89, 90, 91 and the vehicle-body-frame-side hooks 92, 93, 94 corresponding to each other, are connected to each other by way of the elastic members 95, 96, 97 which enable the hooks 89 to 91, and 92 to 94 to be inserted into the elastic members 95, 96, 97 and to engage with the elastic members 95, 96, 97. Accordingly, the exhaust muffler 59 can be easily assembled to the vehicle body frame F from behind the vehicle body frame F and hence, assembling property can be enhanced.

The rear floor 20 positioned above the exhaust muffler 59 covered with the guard member 86 from behind is supported on the rear portion of the vehicle body frame F, and the trailer hitch 88 arranged below the exhaust muffler 59 is fixed to a rear end of the vehicle body frame F. Accordingly, it is possible to miniaturize the guard member 86 dedicated to covering the exhaust muffler 59 by protecting the exhaust muffler 59 with the rear floor 20 and the trailer hitch 88 from above and below.

Although certain embodiments of the present invention has been explained heretofore, the invention is not limited to the above-mentioned embodiment, and various design modifications may be made without departing from the invention described in claims.

For example, certain embodiments of the present invention are not limited to an off-road traveling four-wheeled vehicle, and are broadly applicable to other vehicles.

DESCRIPTION OF REFERENCE NUMERALS AND SIGNS

20: rear floor
28: engine body
46: transmission
58: exhaust port
59: exhaust muffler
60: exhaust pipe passage means
67: bent portion
68: joint
71: bolt constituting fastening member
73: suspension
86: guard member
88: trailer hitch
89, 90, 91: exhaust-muffler-side hook
92, 93, 94: vehicle-body-frame-side hook
95, 96, 97: elastic member E: internal combustion engine
F: vehicle body frame
P: power unit

We claim:
1. A vehicle, comprising:
an internal combustion engine having an engine body; and
a transmission contiguously mounted on the engine body so as to constitute a power unit cooperatively with the internal combustion engine,
wherein the transmission and engine body are mounted on an intermediate portion of a vehicle body frame in the longitudinal direction of the vehicle,
wherein an exhaust port is formed on one side portion of the engine body along the vehicle width direction,
wherein the exhaust port is connected to an exhaust muffler disposed in an extending manner in the vehicle width direction along a rear edge of the vehicle body frame by way of an exhaust pipe passage that introduces an exhaust gas from the exhaust port,
wherein the exhaust pipe passage is disposed in an extending manner in the longitudinal direction of the vehicle while having a bent portion bent toward the center in the vehicle width direction from one side of the engine body in the vehicle width direction behind the engine body as viewed in a plan view, and
wherein the exhaust pipe passage includes a catalyst converter extending in the longitudinal direction of the vehicle between a pair of left and right suspensions supporting a pair of left and right rear wheels on the vehicle body frame in a suspending manner.

2. The vehicle according to claim 1,
wherein a joint separably connects a portion of the exhaust pipe passage on an engine body side and a portion of the exhaust pipe passage on an exhaust muffler side to each other, and is interposed in the bent portion of the exhaust pipe passage, and
wherein a fastening member of the joint is disposed in an extending manner in the vertical direction in a frontwardly and downwardly inclined manner to enable the manipulation of the fastening member from below the vehicle body frame.

3. The vehicle according to claim 1,
wherein exhaust-muffler-side hooks extending toward a front side are fixedly mounted on a plurality of dispersed portions of the exhaust muffler,
wherein a plurality of vehicle-body-frame-side hooks individually corresponding to the exhaust-muffler-side hooks are fixedly mounted on the vehicle body frame in an extending manner toward a rear side, and
wherein the exhaust-muffler-side hooks and the vehicle body-frame-side hooks corresponding to each other are connected to each other by way of elastic members configured to enable the hooks to be inserted into the elastic members and to engage with the elastic members.

4. The vehicle according to claim 1,
wherein a rear floor positioned above the exhaust muffler covered with a guard member from behind is supported on a rear portion of the vehicle body frame, and
wherein a trailer hitch disposed below the exhaust muffler is fixed to a rear end of the vehicle body frame.

5. A vehicle, comprising:
an internal combustion engine means for providing motor power, said internal combustion engine means including engine body means; and
a transmission means for transmitting the motor power of the internal combustion engine, said transmission means contiguously mounted on the engine body means so as to constitute a power unit cooperatively with the internal combustion engine,
wherein the transmission means and engine body means are mounted on an intermediate portion of a vehicle body frame means in the longitudinal direction of the vehicle,
wherein an exhaust port means is formed on one side portion of the engine body means along the vehicle width direction,
wherein the exhaust port means is connected to an exhaust muffler means disposed in an extending manner in the vehicle width direction along a rear edge of the vehicle body frame means by way of an exhaust pipe passage means that introduces an exhaust gas from the exhaust port means,
wherein the exhaust pipe passage means is disposed in an extending manner in the longitudinal direction of the vehicle while having a bent portion bent toward the center in the vehicle width direction from one side of the engine body means in the vehicle width direction behind the engine body means as viewed in a plan view, and
wherein the exhaust pipe passage means includes a catalyst converter means extending in the longitudinal direction of the vehicle between a pair of left and right suspension means supporting a pair of left and right rear wheel means on the vehicle body frame means in a suspending manner.

6. The vehicle according to claim 5,
wherein a joint means separably connects a portion of the exhaust pipe passage means on an engine body side and a portion of the exhaust pipe passage means on an exhaust muffler side to each other, and is interposed in the bent portion of the exhaust pipe passage means, and
wherein a fastening member means of the joint means is disposed in an extending manner in the vertical direction in a frontwardly and downwardly inclined manner to enable the manipulation of the fastening member means from below the vehicle body frame means.

7. The vehicle according to claim 5,
wherein exhaust-muffler-side hook means extending toward a front side are fixedly mounted on a plurality of dispersed portions of the exhaust muffler means,
wherein a plurality of vehicle-body-frame-side hook means individually corresponding to the exhaust-muffler-side hook means are fixedly mounted on the vehicle body frame means in an extending manner toward a rear side, and
wherein the exhaust-muffler-side hook means and the vehicle body-frame-side hook means corresponding to each other are connected to each other by way of elastic member means for enabling the hooks to be inserted into the elastic member means and to engage with the elastic members.

8. The vehicle according to claim 5,
wherein a rear floor positioned above the exhaust muffler covered with a guard member from behind is supported on a rear portion of the vehicle body frame, and
wherein a trailer hitch disposed below the exhaust muffler is fixed to a rear end of the vehicle body frame.

9. An exhaust system mounting structure for a vehicle, wherein said exhaust system mounting structure comprises:
an exhaust port formed on one side portion of an engine body along a vehicle width direction,
wherein the exhaust port is connected to an exhaust muffler arranged in an extending manner in the vehicle width direction along a rear edge of a vehicle body frame by way of an exhaust pipe passage that introduces an exhaust gas from the exhaust port, wherein the exhaust pipe passage is arranged in an extending manner in the longitudinal direction of the vehicle while having a bent portion toward the center in the vehicle width direction from one side of the engine body in the vehicle width direction behind the engine body as viewed in a plan view, and wherein the exhaust pipe passage includes a catalyst converter extending in the longitudinal direction of the vehicle between a pair of left and right suspensions supporting a pair of left and right rear wheels on the vehicle body frame in a suspending manner.

10. The exhaust system mounting structure according to claim 9, wherein a joint separably connects a portion of the exhaust pipe passage on an engine body side and a portion of the exhaust pipe passage on an exhaust muffler side to each other, and is interposed in the bent portion of the exhaust pipe passage, and wherein a fastening member of the joint is disposed in an extending manner in the vertical direction in a frontwardly and downwardly inclined manner to enable the manipulation of the fastening member from below the vehicle body frame.

11. The exhaust system mounting structure according to claim 9, wherein exhaust-muffler-side hooks extending toward a front side are fixedly mounted on a plurality of dispersed portions of the exhaust muffler, wherein a plurality of vehicle-body-frame-side hooks individually corresponding to the exhaust-muffler-side hooks are fixedly mounted on the vehicle body frame in an extending manner toward a rear side, and wherein the exhaust-muffler-side hooks and the vehicle body-frame-side hooks corresponding to each other are connected to each other by way of elastic members configured to enable the hooks to be inserted into the elastic members and to engage with the elastic members.

12. The exhaust system mounting structure according to claim 9, wherein a rear floor positioned above the exhaust muffler covered with a guard member from behind is supported on a rear portion of the vehicle body frame, and wherein a trailer hitch disposed below the exhaust muffler is fixed to a rear end of the vehicle body frame.

* * * * *